(12) United States Patent
Go

(10) Patent No.: US 8,797,488 B2
(45) Date of Patent: Aug. 5, 2014

(54) LIQUID CRYSTAL DISPLAY DEVICE

(75) Inventor: Jae-Kyung Go, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 121 days.

(21) Appl. No.: 12/727,165

(22) Filed: Mar. 18, 2010

(65) Prior Publication Data

US 2011/0063559 A1 Mar. 17, 2011

(30) Foreign Application Priority Data

Sep. 14, 2009 (KR) .......................... 10-2009-0086337

(51) Int. Cl.
*G02F 1/1343* (2006.01)

(52) U.S. Cl.
USPC .......................................................... 349/143

(58) Field of Classification Search
USPC .................................................. 349/143, 144
See application file for complete search history.

(56) References Cited

U.S. PATENT DOCUMENTS 6,816,222 B2 * 11/2004 Ono et al. ...................... 349/143

FOREIGN PATENT DOCUMENTS

| JP | 2001-109401 A | 4/2001 |
|---|---|---|
| JP | 2006-317566 A | 11/2006 |
| JP | 2007-256905 A | 10/2007 |
| JP | 2007-256980 A | 10/2007 |
| JP | 2008-257177 A | 10/2008 |
| KR | 10-2002-0063498 A | 8/2002 |
| KR | 1020050108905 A | 11/2005 |
| KR | 10-2006-0123915 A | 12/2006 |
| KR | 10-2007-0002753 A | 1/2007 |
| KR | 10-2008-0004898 A | 1/2008 |
| KR | 1020080001213 A | 1/2008 |
| KR | 10-2008-0059504 A | 6/2008 |

OTHER PUBLICATIONS

Korean Office Action dated Feb. 15, 2011 for Korean Patent Application No. KR 10-2009-0086337 which corresponds to the captioned application.
Korean Office Action dated Feb. 15, 2011 for Korean Patent Application No. KR 10-2009-0087986 which corresponds to related U.S. Appl. No. 12/727,071, filed Mar. 18, 2010.
Korean Office Action dated Oct. 31, 2011 for Korean Patent Application No. KR 10-2009-0087986 corresponding to U.S. Appl. No. 12/727,071, which is related to captioned U.S. Appl. No. 12/727,165.
Korean Office Action dated Dec. 15, 2011 for Korean Patent Application No. KR 10-2009-0086337 which corresponds to captioned U.S. Appl. No. 12/727,165.

(Continued)

*Primary Examiner* — Sarah Hahm
(74) *Attorney, Agent, or Firm* — Knobbe Martens Olson & Bear LLP

(57) ABSTRACT

A fringe field switching type liquid crystal display device is disclosed. In one non-limiting example embodiment, the devices includes a plurality of gate wirings and a plurality of data wirings intersecting with each other on a substrate to define a plurality of pixels, wherein a plurality of adjacent pixels form a unit and at least one first transparent electrode having a substantially flat shape and formed in each of the pixels. The device may further include a plurality of second transparent electrodes formed in each of the pixels and located over the first transparent electrode, wherein each of the second transparent electrodes comprises two opposing ends and a coupling part configured to electrically connect the ends of all of the second transparent electrodes associated with the unit.

21 Claims, 2 Drawing Sheets

(56) References Cited

OTHER PUBLICATIONS

Japanese Office Action dated Feb. 21, 2012 for Japanese Patent Application No. JP 2009-270595 which shares priority of Korean Patent Application No. KR 10-2009-0086337 with captioned U.S. Appl. No. 12/727,165.

Office Action dated Oct. 12, 2011 for U.S. Appl. No. 12/727,071, filed Mar. 18, 2010, which is related to captioned U.S. Appl. No. 12/727,165.

Korean Office Action dated Oct. 31, 2011 for Korean Patent Application No. KR 10-2009-0086337 which corresponds to captioned U.S. Appl. No. 12/727,165.

Japanese Office Action dated Jun. 12, 2012 for Japanese Patent Application No. JP 2009-270595 corresponding to Korean Patent Application No. KR 10-2009-0086337 which corresponds to captioned U.S. Appl. No. 12/727,165.

\* cited by examiner

LIQUID CRYSTAL DISPLAY DEVICE

CROSS-REFERENCE TO RELATED APPLICATIONS

This application claims priority to and the benefit of Korean Patent Application No. 10-2009-0086337, filed on Sep. 14, 2009, in the Korean Intellectual Property Office, the entire content of which is incorporated herein by reference.

This application relates to U.S. patent application entitled "Liquid Crystal Display Device", which is concurrently filed as this application and incorporated herein by reference in its entirety.

BACKGROUND OF THE INVENTION

1. Field

Non-limiting example embodiments relate to a liquid crystal display device, and more particularly, to a liquid crystal display device that provides reduced disclination.

2. Discussion of the Related Technology

The driving principle of a liquid crystal display device uses the optical anisotropy and polarization characteristics of liquid crystal. The liquid crystal is thin and long to have directionality in arrangement of molecules so that the direction of the molecule arrangement can be controlled by artificially applying electric field.

Therefore, when the direction of the molecule arrangement is optionally controlled, the molecule arrangement of the liquid crystal is changed and light is refracted in the direction of the molecule arrangement of the liquid crystal by the optical anisotropy, making it possible to display an image.

SUMMARY

Non-limiting example embodiments provide a fringe field switching type liquid crystal display device. The liquid crystal display device includes a first transparent electrode in a substantially flat shape that is partitioned for each pixel, a second transparent electrode that is formed in a plurality of substantial stripes shape on the first transparent electrode, and a coupling part that couples the ends of the second transparent electrode. The coupling part that couples the ends of the second transparent electrode in a unit is constituted with an adjacent plurality of pixels rather than in the respective pixels, to minimize the number of disclination generation that becomes the cause to generate a dark portion, thereby improving brightness and image quality.

Non-limiting example embodiments provide a liquid crystal display device. The liquid crystal display device includes gate wirings and data wirings that are intersected with each other on a substrate and arranged to define a pixel region, a first transparent electrode in a substantially flat shape that is formed in the each pixel region, a second transparent electrode that is formed in a plurality of substantial stripes shape on the first transparent electrode, and a coupling part that couples the ends of the second transparent electrode. The coupling part that couples the ends of the second transparent electrode in a unit is constituted with an adjacent plurality of pixels.

Herein, the first transparent electrode may be a pixel electrode and the second transparent electrode may be a common electrode.

Moreover, the plurality of pixels in the unit may be constituted with red R, green G, and blue B pixels that may be vertically adjacent three-line pixels, and for vertically adjacent pixels included in the unit, the second transparent electrode may be arranged in a substantially vertical stripe shape crossing them.

Furthermore, the coupling part may be provided on the top end and the bottom end of the unit to couple the ends of the second transparent electrode to each other, and for a data wiring located in the unit, the second transparent electrode may be arranged to be overlapped completely with the data wiring.

Non-limiting example embodiments provide a liquid crystal display device comprising a plurality of gate wirings and a plurality of data wirings intersecting with each other on a substrate to define a plurality of pixels, wherein a plurality of adjacent pixels form a unit; at least one first transparent electrode having a substantially flat shape and formed in each of the pixels; a plurality of second transparent electrodes formed in each of the pixels and located over the first transparent electrode, wherein each of the second transparent electrodes comprises two opposing ends; and a coupling part configured to electrically connect the ends of all of the second transparent electrodes associated with the unit.

In the above device, the first transparent electrode may be a pixel electrode and each of the second transparent electrodes may be a common electrode. In the above device, the plurality of pixels in the unit comprises red R, green G, and blue B pixels that may be substantially vertically adjacent three-line pixels. In the above device, the unit may comprise vertically adjacent pixels, and wherein the second transparent electrodes may have a substantially vertical stripe shape and may be substantially parallel with the vertically adjacent pixels.

In the above device, the coupling part may be provided on the top end and the bottom end of the unit to couple the ends of the second transparent electrodes to each other. In the above device, at least one of the second transparent electrodes may substantially completely overlap with at least one of the data wirings. The above device may further comprise a protective layer interposed between the first transparent electrode and the second transparent electrodes. In the above device, the coupling part may be substantially perpendicular to at least one of the second transparent electrodes. In the above device, the unit may comprise nine pixels.

Non-limiting example embodiments provide a liquid crystal display device comprising: a plurality of gate wirings; a plurality of data wirings intersecting with the plurality of gate wirings to define a plurality of pixels, wherein at least two adjacent pixels form a unit; a plurality of first transparent electrodes substantially parallel with at least one of the plurality of data wirings; a plurality of second transparent electrodes formed in each of the pixels and located over the first transparent electrodes; and a coupler configured to electrically connect all of the second transparent electrodes associated with the unit.

In the above device, each of the second transparent electrodes comprises two opposing ends, and wherein the coupler is configured to electrically connect the ends of the second transparent electrodes. In the above device, the unit comprises a top end and a bottom end opposing each other, wherein the coupler is provided on the top end and the bottom end of the unit to couple the ends of the second transparent electrodes.

In the above device, at least one of the top and bottom ends of the unit substantially completely overlaps with at least one of the gate wirings. In the above device, at least one of the top and bottom ends of the coupler is substantially perpendicular to at least one of the second transparent electrodes. In the above device, the second transparent electrodes are alternately arranged and substantially parallel with respect to the first transparent electrodes. In the above device, the device is a fringe field switching type liquid crystal display device.

Non-limiting example embodiments provide a liquid crystal display device comprising: a plurality of data wirings; first and second coupling portions spaced part from each other, wherein the data wirings and the coupling portions cross each other to define a unit, and wherein the unit comprises at least two adjacent pixels; at least one common electrode formed in each of the pixels and extending in the unit; and at least one pixel electrode formed in each of the pixels and extending in the unit to be substantially parallel with the common electrode, wherein each of the at least one pixel electrode comprises two opposing ends which are electrically connected to the first and second coupling portions, respectively.

In the above device, at least one of the first and second coupling portions is substantially perpendicular to the at least one pixel electrode. In the above device, the pixel electrodes are alternately arranged with the common electrodes. The above device further comprises a plurality of gate wirings which intersect with the data wirings to define a plurality of pixels, wherein at least one of the first and second coupling portions substantially completely overlaps with at least one of the gate wirings.

BRIEF DESCRIPTION OF THE DRAWINGS

The accompanying drawings, together with the specification illustrate non-limiting example embodiments of the present invention.

DETAILED DESCRIPTION OF NON-LIMITING EXAMPLE EMBODIMENTS

Figure 1:
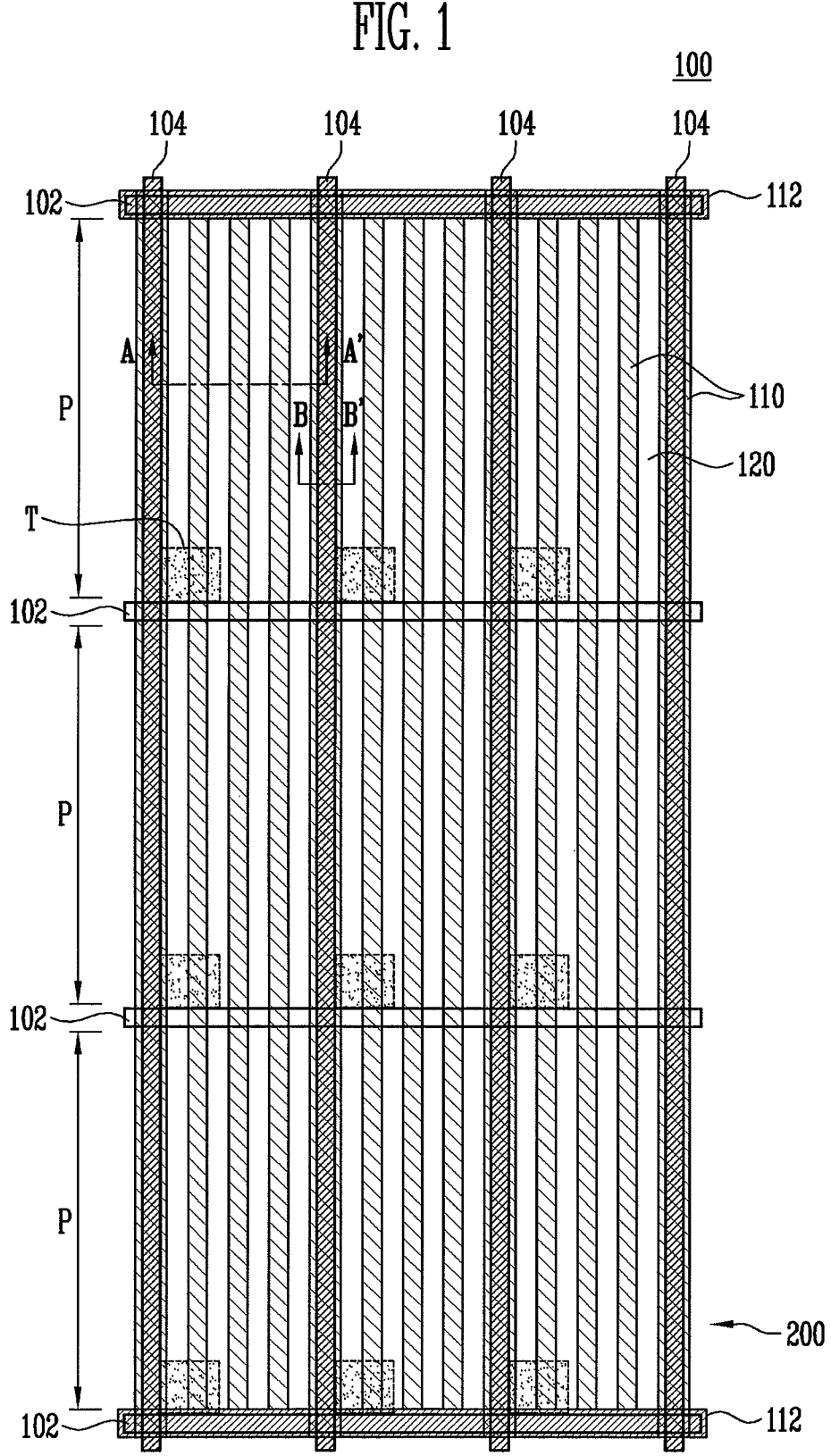
FIG. 1 is a plan view illustrating one region of an array substrate of a liquid crystal display device according to a non-limiting example embodiment of the present invention.

Generally, the liquid crystal display device includes a color filter substrate on which a common electrode is formed, an array substrate on which a pixel electrode is formed, and liquid crystal filled between the two substrates. In such a liquid crystal display device, the liquid crystal is driven by the electric field applied upward and downward between the common electrode and the pixel electrode.

However, the liquid crystal driving by the electric field applied upward and downward has a disadvantage that viewing angle characteristics are not excellent. In order to solve the disadvantage, a horizontal electrical field type liquid crystal display device has been proposed. In the horizontal electrical field type liquid crystal display device, a pixel electrode and a common electrode spaced from each other are formed on an array substrate to form a horizontal electrical field on the substrate surface, the horizontal electrical field being in substantially parallel. However, the horizontal electrical field type liquid crystal display device has a disadvantage that brightness is degraded.

In order to solve the disadvantage of the horizontal electrical field type liquid crystal display device as described above, a fringe field switching (FFS) type liquid crystal display device has been proposed.

In the FFS type liquid crystal display device, a common electrode in a substantially flat shape is formed on a substrate and a plurality of pixel electrodes are formed on the common electrode for each pixel. The respective ends of the pixel electrodes are coupled into one through a coupling part for each pixel.

In the FFS type liquid crystal display device, liquid crystal is driven by the electrical field generated between the lower common electrode and the upper pixel electrodes. In particular, the common electrode and the pixel electrodes are relatively closely located to generate a strong electrical field so that the liquid crystal on the upper portion of the pixel electrodes is also normally operated. This leads to effects that a transmission region may expand, thereby increasing brightness.

However, in the case of the FFS type liquid crystal display device, a coupling part coupling the ends of the respective pixel electrodes as well as the pixel electrodes also generate electrical field with the common electrode so that disclination is generated from the portion where the pixel electrode is coupled to the coupling part.

In other words, the electrical field is also generated between the coupling part and the common electrode in addition to the electrical field generated between the pixel electrode and the common electrode, they having different directions from each other.

Therefore, the liquid crystal on the upper portion of the pixel electrode is driven differently from the liquid crystal on the upper portion of the coupling part so that the movement of the liquid crystal is not clear in the boundary portion of the pixel electrode and the coupling part. In other words, a dark portion is generated from the boundary portion due to the electrical field distortion of the liquid crystal and it is referred to as a disclination.

This is viewed as the dark portion as the distortion of the liquid crystal due to the distorted electrical field blocks the transmission of light, being the cause to degrade brightness and image quality.

In the following detailed description, only certain non-limiting example embodiments of the present invention have been shown and described, simply by way of illustration. As those skilled in the art would realize, the described non-limiting example embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween. Hereinafter, like reference numerals refer to like elements.

Hereinafter, non-limiting example embodiments of the present invention will be described in detail with reference to the accompanying drawings.

Figure 2:
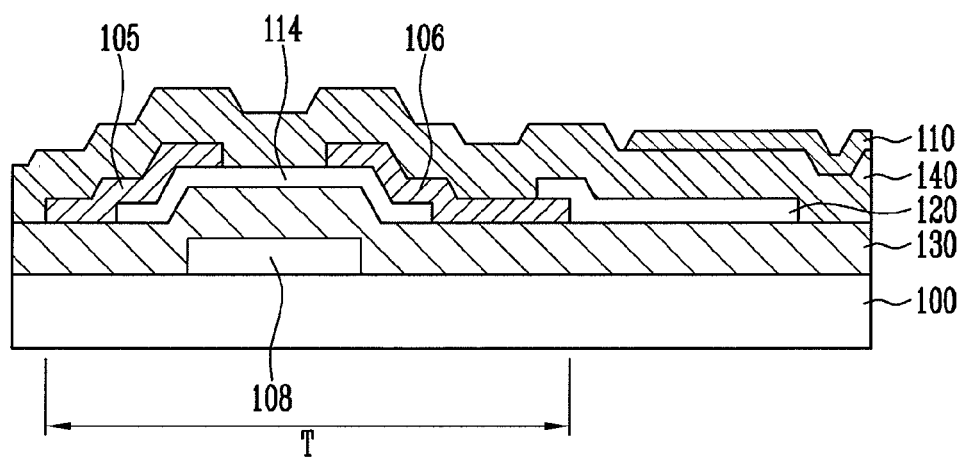
FIG. 2 is a cross-sectional view illustrating the thin film transistor region in FIG. 1.
Figure 3:
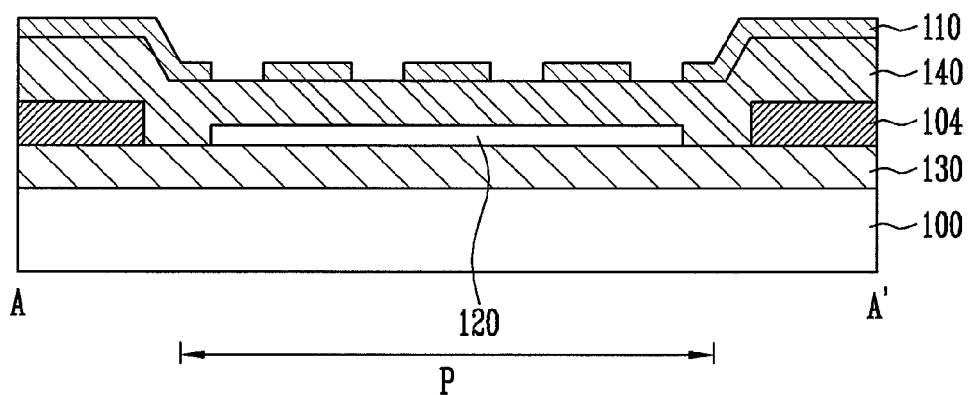
FIG. 3 is a cross-sectional view of a portion A-A' in FIG. 1.
Figure 4:
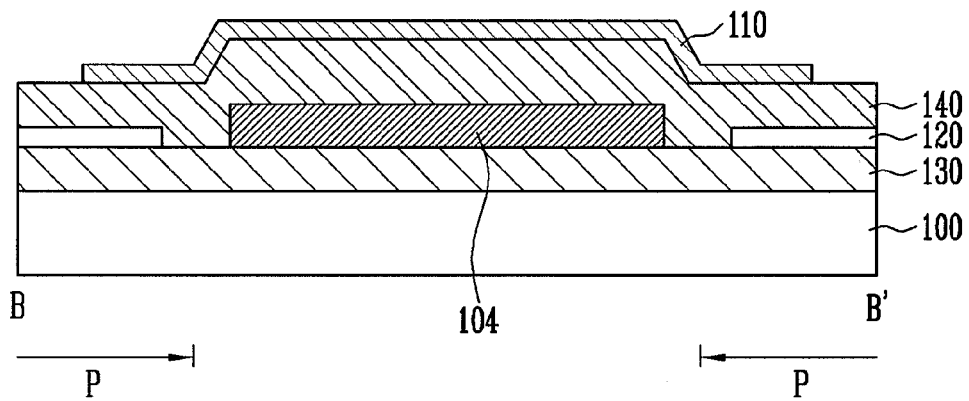
FIG. 4 is a cross-sectional view of a portion B-B' in FIG. 1.

FIG. 1 is a plan view illustrating one region of an array substrate of a liquid crystal display device according to a non-limiting example embodiment of the present invention, and FIG. 2 is a cross-sectional view illustrating the thin film transistor region in FIG. 1. Moreover, FIGS. 3 and 4 are cross-sectional views of portions A-A' and B-B' in FIG. 1. However, FIG. 1 explains the non-limiting example embodiment in which 3 by 3 pixels are implemented as one unit, but the present invention is not limited thereto.

In one non-limiting example embodiment, as shown in FIG. 1, the liquid crystal display device is a fringe field switching type liquid crystal display device. In this non-limiting example embodiment, the liquid crystal display device may comprise wires providing electric signals to a pixel region P and including gate wirings 102 extending in a first direction and data wirings 104 extending in a second direction and intersected with the gate wirings 102. The gate wirings 102 and the data wires 104 may be interested with each other to define the pixel region P, both of which are located on a substrate 100. However, the pixel region P may not be defined using the gate wirings 102 and the data wirings 104. For example, the gate wirings 102 and/or the data wirings 104 may extend through the pixel region P.

Moreover, a thin film transistor T may be located on the area where the gate wiring 102 intersects with the data wiring 104. An exemplary structure of the thin film transistor may be shown in FIG. 2.

In one non-limiting example embodiment, as shown in FIG. 2, the thin film transistor T may include a gate electrode 108 coupled to the gate wiring 102 formed on the substrate 100, a semiconductor layer 114 located on the upper portion of the gate electrode 108, a source electrode 105 located on the upper portion of the semiconductor layer 114 and contacting the data wiring 104, and a drain electrode 106 spaced from the source electrode 105.

A gate dielectric layer 130 may be formed between the gate electrode 108 and the semiconductor layer 114, and a protecting layer 140 may be formed between a first transparent electrode 120 and a second transparent electrode 110.

In one non-limiting example embodiment, as shown in FIGS. 1 and 2, a first transparent electrode 120 in a substantially flat shape may be formed in each pixel region P to be electrically connected to the drain electrode 160. In this non-limiting example embodiment, the first transparent electrode 120 may operate as a pixel electrode.

In one non-limiting example embodiment, a second transparent electrode 110 extending in a second direction and being implemented in a plurality of substantial stripe shape spaced from each other may be formed on the upper portion of the first transparent electrode 120. In this non-limiting example embodiment, the second transparent electrode 110 may operate as a common electrode. The ends of the second transparent electrode 110 may be coupled to each other through a coupling part 112 and a common voltage may be applied to the second transparent electrode 110.

FIG. 3 is a cross-sectional view of a portion A-A' in FIG. 1, illustrating the positional relationship between the first transparent electrode 120 and the second transparent electrode 110 provided in the pixel.

In one non-limiting example embodiment, as shown in FIG. 3, the first transparent electrode 120 may be formed, as a pixel electrode, in a substantially flat shape within the pixel region P between the adjacent data wirings 104 formed on the substrate 100.

In this non-limiting example embodiment, a dielectric layer including a gate dielectric layer 130, etc., may be formed between the substrate 100 and the data wirings 104 and between the substrate 100 and the first transparent electrode 120. The dielectric layer may be formed using inorganic dielectric material, but not limited to, including silicon nitride (SiNX) and silicon oxide ($SiO_2$).

The protecting layer 140 may be formed on the first transparent electrode 120, and the second transparent electrode 110 may be formed on the protecting layer 140 as a common electrode.

In one non-limiting example embodiment, the protecting layer 140 may be formed using inorganic dielectric material including, but not limited to, silicon nitride (SiNX) and silicon oxide ($SiO_2$) or organic dielectric material including, but not limited to, benzocyclobutene (BCB) and acrylic resin.

In one non-limiting example embodiment, the first transparent electrode 120 and the second transparent electrode 110 may include a transparent conductive material. Examples of the transparent conductive material may include indium-tin-oxide (ITO) or indium-zinc-oxide (IZO).

In one non-limiting example embodiment, the second transparent electrodes 110 may be spaced having a predetermined interval in a substantial stripe shape on the positions overlapped with the first transparent electrodes 120 within the pixel region P. In one non-limiting example embodiment, the second transparent electrodes may overlap with the data wirings 104.

In one non-limiting example embodiment, the liquid crystal of the liquid crystal display device may be driven by the electrical field generated between the first transparent electrode 120, formed on the lower portion as the pixel electrode, and the second transparent electrode 110 formed on the upper portion of the first transparent electrode 120 as the common electrode.

In one non-limiting example embodiment, the first transparent electrode 120 and the second transparent electrode 110 may be relatively close to each other, where only the protecting layer 140 may be formed therebetween to generate a strong electrical field. In this non-limiting example embodiment, the liquid crystal located on the upper portion of the common electrode 110 arranged in the substantial stripe shape normally operates.

In one non-limiting example embodiment, the coupling part 112 (or coupler, or coupling means) may be configured to couple the ends of the second transparent electrode 110 in a unit 200 including adjacent plurality of pixels. According to one non-limiting example embodiment, this configuration may be advantageous compared to a typical liquid crystal display device where the ends of the second transparent electrode may be coupled to each other in each of individual pixels. In the typical liquid crystal display device, electric field distortion such as disclination may be generated on the edge portions of the second transparent electrode in every pixel, which may degrade the entire brightness and image quality of the device. According to one non-limiting example embodiment, the number of the disclination may be smaller than the typical liquid crystal display device. This is because the number of the disclination according to the non-limiting example embodiment may correspond to the number of the unit including a plurality of pixels not to the number of the pixels. Thus, according to the non-limiting example embodiments of the present invention, brightness and image quality may be improved.

In one non-limiting example embodiment, as shown in FIG. 1, nine pixels, including the red R, green G, and blue B pixels, are connected via the coupling part 112 as a unit 200. In this non-limiting example embodiment, since the declination, when ever occurs, may be generated only in each unit, the amount of the declination may be as much as one ninth that of the typical liquid crystal display device where such declination occurs in every pixel. Thus, the brightness and image quality of the liquid crystal display device may be improved. In another non-limiting example embodiment, the unit may include at least two pixels, for example, more than or less than nine pixels.

In one non-limiting example embodiment, for the pixel groups in several units, the second transparent electrodes 110 may be arranged in a substantially vertical stripe shape crossing the pixels substantially vertically adjacent to each other. In this non-limiting example embodiment, the coupling part 112, which may couple the ends of the second transparent electrodes, may be provided at the top end and the bottom end of the unit to allow the second transparent electrodes 110 to be coupled to each other. In one non-limiting example embodiment, the coupling part 112 may be substantially line-shaped as shown in FIG. 1. In another non-limiting example embodiment, the coupling part 112 may have other shape or configuration as long as it may electrically connect the ends of the second transparent electrodes 110, included in the unit 200.

In one non-limiting example embodiment, as shown in FIG. 4, the second transparent electrode 110 may be arranged in a substantial stripe shape on the adjacent plurality of pixels, having a predetermined interval. In this non-limiting example embodiment, at least some of the second transparent electrodes 110 may be arranged to overlap substantially completely with the data wiring 104 located in the unit, thereby reducing the advantage of the fringe field switching type that the transmission region may expand.

While the present invention has been described in connection with certain non-limiting example embodiments, it is to be understood that the invention is not limited to the disclosed non-limiting example embodiments, but, on the contrary, is intended to cover various modifications and equivalent arrangements included within the spirit and scope of the appended claims, and equivalents thereof.

What is claimed is:

1. A liquid crystal display device, comprising:
   wires including a plurality of gate wirings and a plurality of data wirings intersecting with each other on a substrate to provide electric signals to a plurality of pixels, wherein a plurality of adjacent pixels form a unit;
   at least one first transparent electrode having a substantially flat shape and formed in each of the pixels;
   a plurality of second transparent electrodes formed in each of the pixels and located over the first transparent electrode, wherein each of the second transparent electrodes comprises two opposing ends; and
   first and second coupling electrodes connected to the second transparent electrodes of the adjacent pixels,
   wherein each first transparent electrode has two opposing ends which are, respectively, electrically connected to the first and second coupling electrodes.

2. The liquid crystal display device as claimed in claim 1, wherein the first transparent electrode is a pixel electrode and each of the second transparent electrodes is a common electrode.

3. The liquid crystal display device as claimed in claim 1, wherein the plurality of pixels in the unit comprise red R, green G, and blue B pixels that are substantially vertically adjacent three-line pixels.

4. The liquid crystal display device as claimed in claim 1, wherein the unit comprises vertically adjacent pixels, and wherein the second transparent electrodes have a substantially vertical stripe shape and are substantially parallel with the vertically adjacent pixels.

5. The liquid crystal display device as claimed in claim 1, wherein the coupling electrode is provided on the top end and the bottom end of the unit to couple the ends of the second transparent electrodes to each other.

6. The liquid crystal display device as claimed in claim 1, wherein the coupling electrode substantially completely overlaps with at least one of the gate wirings.

7. The liquid crystal display device as claimed in claim 1, further comprising a protective layer interposed between the first transparent electrode and the second transparent electrodes.

8. The liquid crystal display device as claimed in claim 1, wherein the coupling electrode is substantially perpendicular to at least one of the second transparent electrodes.

9. The liquid crystal display device as claimed in claim 1, wherein the unit comprises nine pixels.

10. The liquid crystal display device as claimed in claim 1, wherein the coupling electrode at least partially overlaps the second transparent electrodes of the adjacent pixels.

11. A liquid crystal display device, comprising:
    wires including a plurality of gate wirings and a plurality of data wirings intersecting with the plurality of gate wirings to provide electric signals to a plurality of pixels, wherein at least two adjacent pixels form a unit;
    a plurality of first transparent electrodes substantially parallel with at least one of the plurality of data wirings;
    a plurality of second transparent electrodes formed in each of the pixels and located over the first transparent electrodes; and
    first and second coupling electrodes connected to the second transparent electrodes of the adjacent pixels,
    wherein each first transparent electrode has two opposing ends which are, respectively, electrically connected to the first and second coupling electrodes.

12. The liquid crystal display device as claimed in claim 11, wherein each of the second transparent electrodes comprises two opposing ends, and wherein the coupling electrode is connected to the ends of the second transparent electrodes.

13. The liquid crystal display device as claimed in claim 12, wherein the unit comprises a top end and a bottom end opposing each other, wherein the coupling electrode is provided on the top end and the bottom end of the unit to couple the ends of the second transparent electrodes.

14. The liquid crystal display device as claimed in claim 13, wherein at least one of the top and bottom ends of the unit substantially completely overlaps with at least one of the gate wirings.

15. The liquid crystal display device as claimed in claim 13, wherein at least one of the top and bottom ends of the coupling electrode is substantially perpendicular to at least one of the second transparent electrodes.

16. The liquid crystal display device as claimed in claim 11, wherein the second transparent electrodes are alternately arranged and substantially parallel with respect to the first transparent electrodes.

17. The liquid crystal display device as claimed in claim 11, wherein the device is a fringe field switching type liquid crystal display device.

18. A liquid crystal display device, comprising:
    a plurality of data wirings;
    first and second coupling electrodes spaced part from each other, wherein the data wirings and the coupling electrodes cross each other to define a unit, and wherein the unit comprises at least two adjacent pixels;
    at least one common electrode formed in each of the pixels and extending in the unit; and
    at least one pixel electrode formed in each of the pixels and extending in the unit to be substantially parallel with the common electrode, wherein each of the at least one pixel electrode comprises two opposing ends which are electrically connected to the first and second coupling electrodes, respectively.

19. The liquid crystal display device as claimed in claim 18, wherein at least one of the first and second coupling electrodes is substantially perpendicular to the at least one pixel electrode.

20. The liquid crystal display device as claimed in claim 18, wherein the at least one common electrode comprises a plurality of common electrodes, wherein the at least one pixel electrode comprises a plurality of pixel electrodes, and wherein the pixel electrodes are alternately arranged with the common electrodes.

21. The liquid crystal display device as claimed in claim 18, further comprising a plurality of gate wirings which intersect with the data wirings, wherein at least one of the first and second coupling electrodes substantially completely overlaps with at least one of the gate wirings.

* * * * *